Dec. 26, 1944.                E. M. MOREHOUSE                2,366,041
                              WIRE SUPPORTING CLIP
                              Filed April 9, 1943
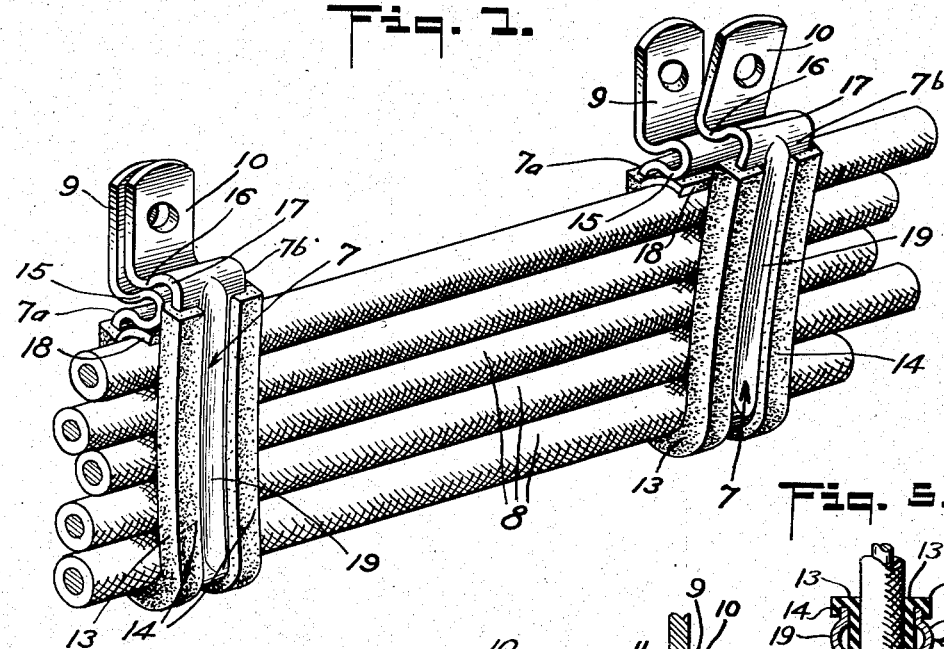
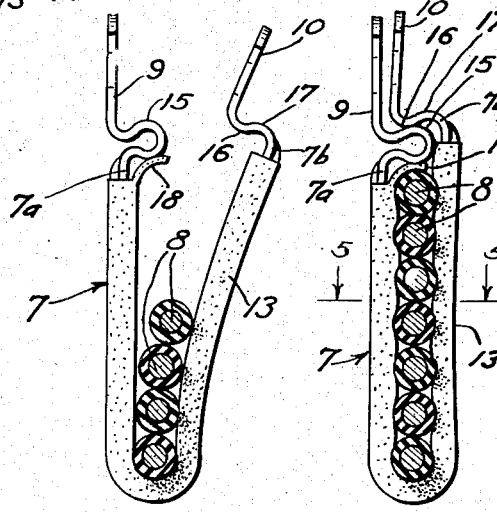
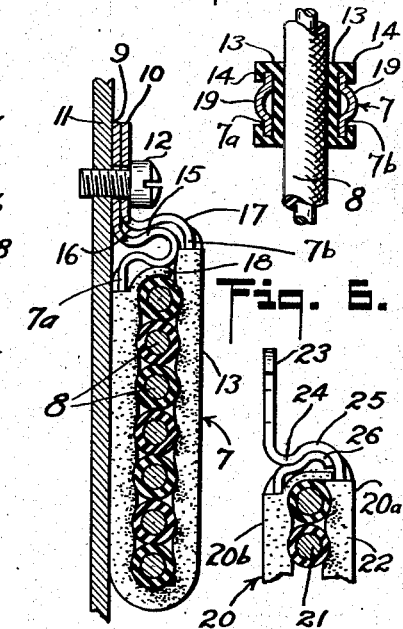
EUGENE M. MOREHOUSE, Inventor
By R. S. Berry, Attorney Patented Dec. 26, 1944

2,366,041

UNITED STATES PATENT OFFICE 2,366,041

WIRE SUPPORTING CLIP

Eugene M. Morehouse, Tujunga, Calif., assignor to Adel Precision Products Corp., a corporation of California Application April 9, 1943, Serial No. 482,485

7 Claims. (Cl. 248—74)

This invention relates to clips for supporting electrical conductors, wires and other lines which extend throughout an aircraft.

A clip of this type is shown in my copending application Serial Number 449,919 filed July 6, 1942, and includes a strap formed into a wire embracing loop which may be closed and clamped around a group of wires or a line to be supported and opened to permit of installation or removal of the wires or line by means of a clamping lever which as a separate element is subject to ready manipulation to facilitate sub-assembly operations or the installation of the wires or line in the clip after the clip is mounted on a structural part of the aircraft.

The present invention has for an object the provision of a clip of the character described which is constructed and arranged so that the lever or similar clamping means heretofore used is unnecessary, and compared to clips heretofore made, is lighter as to weight, subject to an easier and quicker application, more reliable as to performance, and consists of fewer parts and has no separate movable parts, due to the use of a simple form of fastening means embodied in the wire-embracing loop and operating automatically when the loop is closed around the wires or line, to clamp and hold the clip in place and in position to be readily secured to a structural part of the aircraft.

Another object of my invention is to provide a clip of the character described wherein a strap is formed into a wire-embracing loop closed at one end and normally open at the other end and provided at the open end with snap fastening members which interlock when the open end of the loop is closed, thereby providing for a quick and easy application of the clip in sub-assembly operations by merely clipping it onto a group of wires and pressing the ends of the loop together, after which the clip is readily fastened to a structural part of the aircraft.

Another object of my invention is to provide a clip of the character described in which an apertured end of the wire-embracing loop is arranged so that when secured by a screw or bolt to a structural part of the aircraft will positively hold the interlocked fastening elements together and insure a secure fastening of the clip in place.

A further object of my invention is to provide a clip of the character described in which a cushion strip of yieldable material lining the wire-embracing loop is placed under compression when the clip is locked around the wires, the cushion strip then exerting a force tending to hold together the interlocked fastening members while at the same time affording a vibration-absorbing and wear-preventing seat for the wires or line supported in the loop.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a sub-assembly unit showing how the clips embodying my invention are applied to and closed and locked around a group of wires preliminary to the installation of the unit in an aircraft;

Fig. 2 is a side elevation of the clip as when open;

Fig. 3 is a side elevation of the clip as when closed and locked around a group of wires;

Fig. 4 is a side elevational part sectional view showing the clip and wires as when installed on a structural part of an aircraft;

Fig. 5 is a cross sectional view taken on the line 5—5 of Fig. 3;

Fig. 6 is a fragmentary side elevation of a modified form of clip embodying my invention.

Referring to the drawing more specifically it is seen that my improved clip includes a strap of metal or other preferably form-retaining and somewhat resilient material formed into an elongated loop 7 for embracing a group of wires 8 or a conduit or other line not shown.

The loop 7 is closed at one end and normally open at its other end and as shown in Figs. 1 to 4 inclusive has outwardly extended opposed apertured ends 9 and 10 serving as attaching ears which are brought together so that the loop is closed and may be secured to structural part 11 of an aircraft by means of a screw 12 or like fastening.

The apertured end 9 is disposed substantially in the plane of the leg 7a of the loop and this leg and end are adapted to lie against the structural part 11 as shown in Fig. 4, there being, however, on the loop 7 a cushion strip 13 of yieldable material having retaining flanges 14 on the outer face of the legs 7a and 7b so that these flanges on the leg 7a will be compressed against said structural part. This cushion strip provides a protective wear-preventing and vibration-absorbing seat for the wires 8 or line supported in the loop.

As a means for quickly and easily locking the loop closed around the wires so that it is clamped thereon incident to the moving of the ends of the loop together with the fingers of one hand, or if desired, with a suitable tool, I provide on the strap at the open end of the loop fastening elements which will automatically interlock and hold the loop securely in place on the wires with the ends 9 and 10 in position to be readily secured to the structural part 11 of the aircraft.

One of these fastening elements is in the form of a tongue 15 having an enlarged rounded outer end, said tongue being formed by doubling the strap at the juncture of the end 9 with the open end of the loop and extending said doubled portion laterally toward the opposite end 10. The opposed portions forming the tongue 15 are somewhat spaced apart to provide a yielding and resilient action.

The other fastening element comprises a rounded inwardly extending shoulder 16 formed at the juncture of the end 10 and a laterally extended portion 17 defined by laterally off-setting the end 10 in a direction toward the end 9. This laterally offset end will lie substantially in the plane of the leg 7a when the ends 9 and 10 are secured to the part 11 as shown in Fig. 4.

It is now apparent that when the ends of the loop are forced together from the spaced apart position shown in Fig. 2 to the loop-closing position shown in Fig. 3, for the purpose of mounting the clip on the group of wires to be supported, the tongue 15 and shoulder 16 will engage and move past one another into interlocking relation whereby the clip will be held clamped on the wire with the apertures in the ends 9 and 10 aligned for reception of the screw 12. The laterally extended portion 17 is outwardly bowed beyond the shoulder 16 to form a pocket for reception of the enlarged end of the tongue 15 as shown in Figs. 3 and 4. The formation of the tongue 15, shoulder 16 and portion 17 is such that the opposed faces of these parts have an ogee curvature effective of a snap fastening action when moved into predetermined relative positions while engaged with one another. Such a fastening arrangement exerts a holding or locking force sufficient to maintain the clip in sub-assembly formation on the group of wires, with the ends 9 and 10 close to one another and subject to being easily secured to the aircraft. It is unnecessary to hold the clip with one hand while securing it to the aircraft, and the operator therefore has the use of both hands to effect a quick and easy installation of the clip on the aircraft.

The cushion strip 13 has a lip 18 at one end arranged to lie between the uppermost wire and the tongue 15 to cushion said wire as shown in Figs. 3 and 4.

It is now seen that my improved clip may be advantageously used in sub-assembly and other installation operations since it does not require manipulation of a separate fastening or clamping member and may be clipped on and clamped around a group of wires or the like in one simple operation performed with one hand.

The leg 7b is bowed inwardly so that when the clip is closed and clamped around the wires this leg will forcibly clamp against the wires and hold them tightly in small compass, said leg straightening out somewhat and thereby effecting a tensioned clamping action on the group of wires and exerting a force tending to hold the tongue 15 and shoulder in tightly interlocked engagement with one another, this latter action being also enhanced by the compression of the cushion strip 13.

As here shown the loop 7 is provided with reinforcing ribs 19 extending lengthwise of the legs 7a and 7b thereof.

In Fig. 6 there is shown a modified form of my invention comprising a clip identical with the clip shown in Figs. 1 to 5 except that one of the apertured ends of the loop is eliminated and the locking tongue is of different formation.

This modification includes a loop 20 for embracing wires 21, a cushion strip 22, an offset apertured end 23 on the outer leg 20a and a laterally extending portion 24 and shoulder 25 corresponding to shoulder 16 and portion 17 in Figs. 1 to 5. The inner leg 20b has its free end bent laterally toward the leg 20 to form a locking tongue 26 similar to the tongue 15 but formed of a single instead of a double portion of the strap and adapted to interlock with the shoulder 25 in the same manner as the tongue 15.

It is seen that the single apertured end 23 when secured to the airplane structure in the same manner as shown in Fig. 4 will hold the loop closed and prevent the locking members from springing apart. The elimination of one apertured end as in this device saves material and reduces the weight of the clip and this form may be preferable in some instances for these reasons.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting a group of wires, a strap formed into an elongated loop closed at one end and open at its other end and adapted to embrace a group of wires; normally spaced apart end portions of the strap adapted to be brought together to close the loop and provide for the fastening of the clip to a support, one leg of said loop and the end portion thereon being substantially aligned, the other end portion being laterally offset toward said aligned end portion, said strap being doubled at the juncture of said one leg with said aligned end portion and extended toward the other leg of the strap to form a snap fastening tongue; and a snap fastening shoulder formed at the juncture of the offset end portion and said other leg and adapted to be moved into locked engagement with said tongue when said ends are brought together.

2. In a clip for supporting a group of wires, a strap formed into an elongated loop closed at one end and open at its other end and adapted to embrace a group of wires, normally spaced apart end portions of the strap adapted to be brought together to close the loop and provide for the fastening of the clip to a support, one leg of said loop and the end portion thereon being substantially aligned, the other end portion being laterally offset toward said aligned end portion, said strap being doubled at the juncture of said one leg with said aligned end portion and extended toward the other leg of the strap to form a snap fastening tongue; and a snap fastening shoulder formed at the juncture of the offset end portion and said other leg and adapted to be moved into locked engagement with said tongue when said ends are brought together, said strap having an outwardly bowed portion between said shoulder and said other leg to receive said tongue when said tongue and shoulder are in locked engagement with one another.

3. In a clip for supporting a group of wires, a strap formed into an elongated loop closed at one end and open at its other end and adapted to embrace a group of wires; normally spaced apart end portions of the strap adapted to be brought together to close the loop and provide for the fastening of the clip to a support, one leg of said loop and the end portion thereon being substantially aligned, the other end portion being laterally offset toward said aligned end portion, said strap being doubled at the juncture of said one leg with said aligned end portion and extended toward the other leg of the strap to form a snap fastening tongue; a snap fastening shoulder formed at the juncture of the offset end portion and said other leg and adapted to be moved into locked engagement with said tongue when said ends are brought together; and a cushion strip of yieldable material lining said loop and being placed under compression when said end portions are secured together on said support with the group of wires embraced by said cushion.

4. In a clip for supporting a group of wires, a strap formed into an elongated loop closed at one end and open at its other end and adapted to embrace a group of wires, normally spaced apart end portions of the strap being adapted to be brought together to close the loop and provide for the fastening of the clip to a support, one leg of said loop and the end portion thereon being substantially aligned, the other end portion being laterally offset toward said aligned end portion; the legs of said strap adjacent to its open end being contoured to form cooperating snap fastening members disposed to lock together when the end portions of the strap are brought together.

5. In a clip for supporting a group of wires, a strap formed into an elongated loop closed at one end and open at its other end and adapted to embrace a group of wires, normally spaced apart end portions of the strap adapted to be brought together to close the loop and provide for the fastening of the clip to a support; and cooperating snap fastening members being formed integral with said strap adjacent said end portions arranged to interlock when said end portions are moved together to close said open end of the loop.

6. In a clip for supporting a group of wires, a resilient strap formed into a loop normally open at one end and adapted to embrace a group of wires; an end portion on said strap projecting from the open end of the loop and being adapted to be secured to a support; cooperating snap fastening members being carried by the strap at the open end of the loop and projecting toward one another so that when moved together they will interlock and close the loop and hold said end portion of the strap in position to be secured to a support.

7. In a clip for supporting a group of wires, a resilient strap formed into an elongated loop closed at one end and open at its other end and adapted to embrace a group of wires; an end operating said strap projecting from the open end of the loop and adapted to be secured to a support; said strap being bent at the juncture of said end with the loop to provide a shoulder and a tongue on said strap adapted to interlock with said shoulder to hold the loop closed and said end in position to be secured to a support.

EUGENE M. MOREHOUSE.